(12) United States Patent
Groenewoud et al.

(10) Patent No.: US 6,738,146 B2
(45) Date of Patent: May 18, 2004

(54) METHOD FOR MEASURING THE SPIN IN AN OPTICAL FIBRE

(75) Inventors: Marco Groenewoud, Eindhoven (NL); Jozef Wilhelmus Quirinus Fianen, Oisterwijk (NL)

(73) Assignee: Draka Fibre Technology B.V., Eindhoven (NL)

( * ) Notice: Subject to any disclaimer, the term of this patent is extended or adjusted under 35 U.S.C. 154(b) by 0 days.

(21) Appl. No.: 09/986,595

(22) Filed: Nov. 9, 2001

(65) Prior Publication Data

US 2002/0067488 A1 Jun. 6, 2002

(30) Foreign Application Priority Data

Nov. 10, 2000 (NL) .............................................. 1016586

(51) Int. Cl.[7] .................................................. G01B 9/02
(52) U.S. Cl. ........................ 356/496; 356/477; 356/73.1
(58) Field of Search ............................... 356/28.5, 73.1, 356/450, 477, 496, 521

(56) References Cited

U.S. PATENT DOCUMENTS

| 4,307,296 A | * | 12/1981 | Presby ..................... 250/459.1 |
| 4,847,509 A | * | 7/1989 | Millet et al. ........... 250/559.24 |
| 5,283,628 A | | 2/1994 | Dotson et al. |

FOREIGN PATENT DOCUMENTS

| EP | 0 586 964 | 3/1994 |
| FR | 2 792 066 | 10/2000 |
| WO | WO 97/30945 | 8/1997 |

* cited by examiner

*Primary Examiner*—Samuel A. Turner
*Assistant Examiner*—Michael A. Lyons
(74) *Attorney, Agent, or Firm*—Oblon, Spivak, McClelland, Maier & Neustadt, P.C.

(57) ABSTRACT

The invention relates to a method for measuring the spin in an optical fibre by irradiating an optical fibre with light so as to form an interference pattern, wherein the ovality of the optical fibre, which results in a continuously changing interference pattern, is used for determining the spin in the optical fibre.

7 Claims, 1 Drawing Sheet

METHOD FOR MEASURING THE SPIN IN AN OPTICAL FIBRE

FIELD OF THE INVENTION

The present invention relates to a method for measuring the spin in an optical fibre by irradiating an optical fibre with light so as to form an interference pattern.

DESCRIPTION OF RELATED ART

Such a method is known per se from European patent no. 0 785 913 which has been granted to the present applicants. According to the method disclosed therein, as described in embodiment 4, the outer surface of the preform from which the fibre is drawn is provided with a short score-line extending substantially parallel to the preform's longitudinal axis. Subsequently, a test optical fibre is drawn from this scored portion of preform by heating the preform to a temperature above the plasticizing temperature thereof. Since a rotation is imparted to the fibre during said drawing process, the score-line will rotate along with the fibre material when spin is being imparted to the fibre. When the protective coating is chemically removed from such a test optical fibre and the fibre is subsequently transversely irradiated by a laser source, for example a HeNe laser, the laser light will produce a diffraction pattern on a screen disposed behind the irradiated portion of the fibre. The presence of lateral asymmetry, viz. the score-line which is also present in the optical fibre that is formed in this manner, produces a characteristic diffraction pattern with a clear visually detectable intensity maximum. Said intensity maximum undergoes a visible shift upon slow manual rotation of the fibre around its longitudinal axis. By slowly moving the laser source slowly along a given length of the fibre and subsequently monitoring the angle through which the fibre is to be hand-rotated so as to keep the diffraction pattern constant, it is possible to measure the spin amplitude, viz. the maximum spin angle which has been imparted to the fibre, and the so-called spatial period. Thus it is possible to determine the number of rotations per unit length of the optical fibre on the basis of the interference pattern or diffraction pattern. Such a method has appeared to be labour-intensive and time-consuming in practice. Moreover, such a method must be carried out separately for each drawing tower, because each drawing tower possesses characteristic process parameters. Another drawback is the fact that such a measurement is not carried out during the actual drawing process, so that any undesirable deviations in the spin of the optical fibre cannot be directly corrected.

The term Polarisation Mode Dispersion (PMS) relates to the dispersion of a signal that propagates through an optical fibre, in particular a so-called single mode fibre, as a result of birefringence in the core portion of the fibre. This birefringence is generally caused by imperfections in the fibre, such as a so-called ovality or non-circularity of its core cross-section, asymmetrical lateral stress, etc. In a single mode fibre, the light can propagate in two orthogonal modes (two polarisation directions). If the fibre core possesses the aforesaid imperfections, one of said modes will propagate through the fibre faster than the other mode. This results in a difference in delay, as a result of which dispersion will occur. The PMD value indicates the difference in delay between the two polarisation directions. In general it obtains that the higher the PMD, the poorer the fibre quality. Thus it is desirable to enhance the PMD, for example by rotating the fibre, which is still slightly plastic, as it is drawn from the heated preform, so that a spin becomes "frozen" into the fibre as it cools, The resulting stress in the fibre produces continuous mode-coupling between the orthogonal polarisation modes of a carried signal, thereby inhibiting the accumulation of a significant phase lag between the two modes, which thus causes a significant reduction in the fibre's PMD.

In practice it has become apparent that an optical fibre's PMD is too high at some positions in the optical fibre. Analysis of this problem has shown that the overall PMD, measured over the entire fibre length, can meet the desired low value requirement indeed, but that the PMD of the individual parts formed by cutting the fibre into short lengths may no longer range within the desired specifications. From this it can be concluded that the effects that lead to a higher PMD can possibly be averaged out when the length of the optical fibre increases.

Methods for manufacturing optical fibres having a low PMD are generally known from the prior art, for example from U.S. Pat. No. 5,298,047, European patent application no, 0 795 521, European patent application no. 0 744 636, International patent application no. WO 97/26221 and International patent application no. WO 98/46536, which optical fibres can all be subjected to the present method for measuring the spin.

Thus it is desirable to develop a method which measures the spin in an optical fibre continuously, so that the optical fibre's PMD will fall within the required specification for any fibre length. In addition, it is desirable to develop a method for measuring the spin in the optical fibre wherein the method does not required a so-called test run on a drawing tower but which allows direct use in any drawing tower.

In addition to that it is desirable to develop a method for measuring the spin in an optical fibre which can be used during the fibre production.

SUMMARY OF THE INVENTION

According to the invention, the method as referred to in the introduction is characterized in that the ovality of the optical fibre, which results in a continuously changing interference pattern, is used for determining the spin in the optical fibre.

Since the optical fibre possesses an inherently small ovality or non-circularity, the rotation or spin that is imparted to the optical fibre will result in a continuous diameter change when using an interferometric measuring method, wherein the fibre to be measured is continuously irradiated with light so as to produce the interference pattern. This optical technique comprises the irradiation of the fibre in a direction perpendicularly to the direction of movement of the fibre, thus producing an interference pattern as a result of the superposition of light being reflected from the fibre surface and light being deflected from the fibre body. The interference pattern will in fact be a function of the wavelength of the incident light and of the refractive index values and the diameters both of the fibre core and of the fibre cladding.

According to the present method, the shift of the interference pattern is preferably measured at an angle of 48–72° to the incident light beam.

This can be followed in real time, as it were, without complicated calculations being required, as is the case with U.S. Pat. No. 5,309,221. By using this real time information, which is available upon measurement of the shifts in the interference pattern, it is possible to determine the amount of rotations or spin in the fibre, even at high velocities of movement of the optical fibre. Thus it is possible with the present invention to measure the spin in an optical fibre at the time of the production thereof.

The term "spin" as used in connection with the present invention relates to the rotations or twists that have been imparted to the optical fibre. Said terms are interchangeable within the framework of the present introduction to the disclosure.

Although a method for measuring the diameter of a transparent filament on the basis of an interference pattern is known from the aforesaid U.S. Pat. No. 5,309,221, it can be established that the method that is known therefrom is unsuitable for use at high throughput speeds of the optical fibre. The reason for this is that the detected interference pattern undergoes a number of mathematical calculations, as a result of which the response time of such a measurement is relatively long, which makes it unsuitable for high throughput speeds.

It is especially preferable to measure the interference pattern during the drawing process for producing the optical fibre from the molten preform, in particular at a drawing speed >10 m/s.

Since the commercial drawing towers operate at drawing speeds >10 m/s, it is necessary to acquire accurate information with regard to the number of rotations that have been imparted to the fibre when such speeds are used. As already described before, a device for imparting the spin to the optical fibre is used for producing the spin in an optical fibre, In practice, a specific value is set in such a device, which value is a measure for the desired spin in the optical fibre. Since the drawing process is subject to a large number of process parameters, such as the oven temperature, the gas velocities in the over, the cooling rate of the optical fibre, the guide wheel settings and the like, the degree of spin in the optical fibre will be liable to change. According to the present method it is thus possible to relate the spin measured from the continuously changing interference pattern to the functioning of the device that is used for imparting the spin to the optical fibre.

The device for imparting the spin to the fibre is preferably disposed downstream of the device that continuously measures the interference pattern of the optical fibre. Thus the spin that has been "frozen" into the optical fibre is directly measured and any correction can directly be transmitted to the downstream device which continuously imparts spin to the fibre.

It is especially preferred for the method to comprise the following steps:

i) setting a set value in the device for imparting spin to the optical fibre, ii) carrying out an interference pattern measurement on the optical fibre, iii) calculating, on the basis of the measured interference pattern, a measured value which represents the amount of spin in the optical fibre, and iv) comparing the set value of i) with the measured value of iii) and, if necessary, adjusting the set value until the desired amount of spin in the optical fibre is achieved.

The device for imparting spin to the optical fibre is in particular preferred to comprise two pairs of wheels which rotate in opposite directions about the two different axes of rotation, between which wheels the optical fibre is passed, as a result of which spin is imparted to the optical fibre. The wheels are moved back and forth relative to one another in a direction substantially perpendicular to the optical fibre so as to roll the fibre alternately to the left and to the right between the wheel surfaces. It is in particular preferred for the back-and-forth motion of the wheels to be uniformly periodic, so that quite a significant PMO reduction is effected.

DESCRIPTION OF THE DRAWING

The present invention will now be explained by means of an example, wherein the interference pattern signal is shown in the appended FIGURE.

DESCRIPTION OF THE PREFERRED EMBODIMENT

Figure 1:
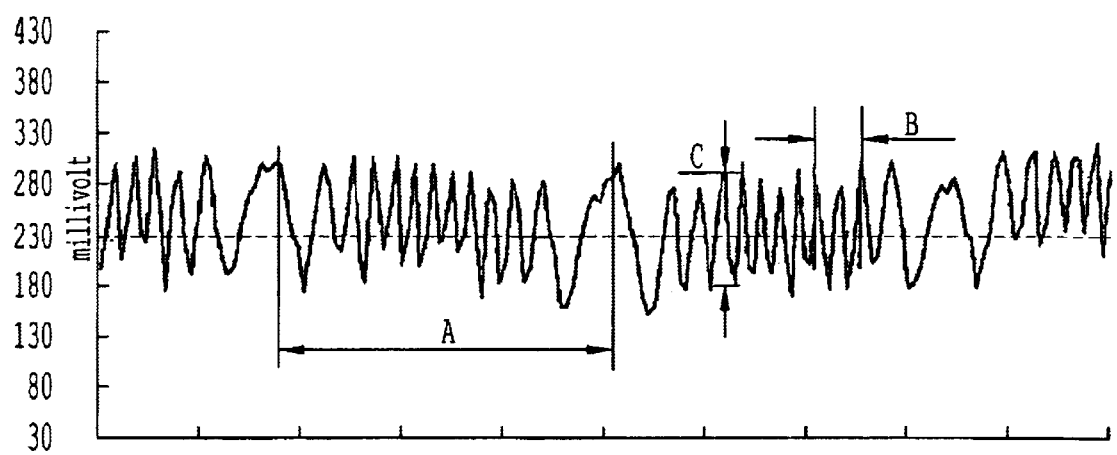

The reference signal that is shown in the appended FIGURE has been obtained by irradiating the optical fibre with light in a direction perpendicularly to the direction of movement thereof. A device consisting of two pairs of wheels is used as the device for imparting the spin to the optical fibre. It appears from the FIGURE that the interference signal is periodically interrupted, which is indicated with distance A. This Interruption is caused by the reversing of the wheels of the aforesaid device. Set off on the x-axis is the number of milliseconds per division. On the basis thereof it is possible to calculate the time that is needed for reversing the wheels of the device for imparting the spin to the optical fibre. The appended FIGURE furthermore schematically shows a distance 8, within which distance B two downwardly extending peaks are shown. Said two peaks represent a full rotation of the optical fibre. Thus the number of rotations of the optical fibre can be calculated within one turn of the wheels. In addition, it is possible to calculate from this FIGURE the number of optical fibre rotations that are presented to the oven where the optical fibre is drawn by means of plastic deformation from the preform that has been heated to the plasticizing temperature. Thus it is possible to compare this value with the number of rotations that are actually frozen into the fibre. The FIGURE furthermore shows a distance C, which distance C, also called amplitude, depends on the non-circularity or ovality of the preform cladding. The number of actual rotations being generated by the device for imparting the spin to the optical fibre can be determined from the FIGURE by means of the measured interference signal. Only a number of said generated rotations are frozen in the optical fibre. Since the number of generated rotations is not the same as the number of rotations that are frozen into the fibre, a so-called efficiency constant, RC, can be defined. wherein:

Number of generated rotations*$RC$=Number of rotations frozen into the optical fibre By means of the above formula, feedback as regards the functioning of the device used for imparting the spin to the optical fibre and the spin that is measured from the continuously changing interference pattern can be readily obtained for each drawing tower.

What is claimed is:

1. A method for measuring a spin in an optical fibre possessing an inherently small ovality, comprising:
   continuously irradiating an optical fibre with incident light so as to form an interference pattern that is a function of a wavelength of the incident light, a refractive index of the fibre, and a diameter of the fibre;
   calculating a shift of the interference pattern in real time; and
   determining the spin in the optical fibre based on the calculated shift in the interference pattern.

2. The method according to claim 1, wherein continuously irradiating comprises continuously irradiating the optical fibre and measuring the interference pattern at an angle between 48° and 72° to the incident light.

3. The method according to claim 1, wherein continuously irradiating comprises continuously irradiating the optical fibre and measuring the interference pattern while the optical fibre is drawn at a drawing speed greater than 10 m/s.

4. The method according to claim 1, further comprising:
imparting the spin to the optical fibre prior to continuously irradiating the optical fibre.

5. The method according to claim 1, further comprising:
imparting the spin to the fibre with a device disposed downstream of a device configured to continuously irradiate the optical fibre.

6. The method according to claim 1, further comprising:
determining an operating condition to achieve a desired spin for the optical fibre;
imparting the spin to the optical fibre based on the operating condition; and
adjusting the operating condition when the spin does not equal the desired spin.

7. The method according to claim 1, further comprising:
imparting the spin to the optical fibre with a device comprising two pairs of wheels which rotate in opposite directions about two different axes of rotation, wherein the wheels are configured to move back and forth relative to one another.

* * * * *